Patented July 21, 1925.

1,547,076

UNITED STATES PATENT OFFICE.

HERMANN STAUDINGER, OF ZURICH, SWITZERLAND, ASSIGNOR TO THE SOCIETY OF CHEMICAL INDUSTRY IN BASLE, OF BASEL, SWITZERLAND.

METHOD OF PRODUCING EXPLOSIONS.

No Drawing.      Application filed June 8, 1923. Serial No. 644,242.

*To all whom it may concern:*

Be it known that I, HERMANN STAUDINGER, a citizen of the Swiss Republic, and residing at Zurich, Switzerland, have invented a new and useful Method of Producing Explosions, of which the following is a full, clear, and exact specification.

It is known that the light metals of the first and second group of the periodic classification can react with many substances and that in the course of such reactions frequently considerable quantities of energy are gradually liberated, as a rule in form of heat.

I have now found that such reactions which are associated with the liberation of considerable quantities of energy can be increased to explosions, if the mentioned metals and the suitable substances are suddenly brought into intensive contact with each other, such as for instance by a strong impact or blow. In this way powerful explosions are produced which can be utilized in practice for various purposes, such as for instance for bursting purposes in mines, quarries, and so on, for exploding artillery projectiles, bombs, and the like, for initiating the explosion of the various known explosives, and what else comes into question in practice. The term light metals includes also mixtures and alloys, such as for instance amalgams of them.

As regards the intensity of the explosions same can be graduated at option in various ways according to the choice of the light metal and the substances to be reacted on with the same. The more electro-positive the metal, the more intensive is its action generally; potassium for example gives more sensitive combinations than sodium or lithium, also barium acts more energetically than calcium or strontium. The most vigorous is the action of a liquid potassium-sodium alloy.

As to the substances to be reacted on with light metals the following come into consideration: inorganic halogen compounds in as far as they are not halides, organic halogen compounds, inorganic oxygen or sulfur compounds in as far as they are not metallic oxides or metallic sulfides, organic oxygen or sulfur compounds, inorganic and organic compounds which contain two or more of the mentioned elements (halogen, oxygen, sulfur), and finally mixtures of the mentioned compounds among themselves or with indifferent bodies.

Of inorganic halogen compounds there may be mentioned: compounds of the metalloids with halogen, such as the halogen derivatives of sulfur, phosphorus, silicon, arsenic, antimony, tin, furthermore acid chlorides such as phosphorus oxychloride, sulfuryl chloride, nitrosyl chloride, and finally chlorates and perchlorates.

As organic halogen compounds there come into consideration for instance: acid chlorides such as acetyl chloride, oxalyl chloride, phosgene, halogen substituted acid halides, polyhalogen compounds of methane, ethane, propane, acetylene, ethylene, highly halogenated derivatives of benzene, toluene, xylene, napththalene, and so on. The detonation takes place the easier the more halogen is contained in the molecule of the respective substance, and the less inert groups are present in their molecule.

Generally it may be said that all halogen compounds, in as far as they are not halides, can react with light metals in such a manner that an explosion occurs at a sufficiently powerful impact or blow, provided that the inert part of the molecule of the respective substance is not too great. In order to produce the explosion it can for instance be proceeded in such a manner that a liquid potassium-sodium alloy is charged undermost into a siutable receptacle, on the top of which the respective compound is placed, if necessary enclosed in a thin glass container, whereupon the receptacle is dropped from a sufficient height. With combinations of a light metal and a substance capable of reaction, which are relatively inert and in case of which the dropping from a limited height would consequently not suffice for producing an explosion, the explosion can be brought about in another suitable manner, such as for instance by dropping a correspondingly heavy hammer thereon.

Of oxygen or, respectively, sulfur compounds the following are for example suitable: carbon dioxide, nitrates, nitrites, thiophosgene, carbon oxysulfide, carbon disulfide, sulfur dioxide, sulfur trioxide, organic compounds rich in oxygen, such as for instance oxalic ester, acetic acid, nitro-compounds of the alipathic and aromatic series.

Especially easily there will react strong endothermic oxygen compounds, particularly the derivatives of nitrogen, such as for example nitrogen dioxide and the organic nitro-derivatives, the esters of nitric acid and nitrous acid, that is to say, nitromethane, ethyl nitrate, ethyl nitrite, nitroglycerin, above all also the organic poly-nitro-compounds, finally also halogen nitrocompounds, such as for example chloropicrin or aromatic halogen nitro-compounds.

Of particular importance it is also that with bodies which besides the property of being able of reacting with light metals possess in themselves already explosive properties the suddenly instituted detonation with a light metal acts simultaneously as priming agent for larger quantities of the explosive present, the detonation locally occurring in the first moment being conveyed further. In this manner, for instance, larger quantities of compounds, such as trinitrotoluene, picric acid, chlorate explosives, nitro-explosives, liquid air explosives, for instance oxyliquit, and even relatively inert substances, which by the ordinary priming agents are not or only with difficulty to be exploded, such as dinitrobenzene or a mixture of ammonium nitrate and ammonium sulfate, can be brought to explosion without employing a special priming agent. On a larger quantity of picric acid, for instance, there is placed a glass ampulla filled with potassium; by a powerful impact the same is shattered and simultaneously the explosion of the whole mass is instituted by contact of the potassium with the picric acid. In place of a single potassium ampulla there may also be employed two ampullae, one filled with potassium, the other with a halogen or oxygen or sulfur compound, for instance carbon tetrachloride, and by simultaneously shattering the two the detonation can be brought about.

What I claim is:

1. Method for producing explosions, consisting in instituting a sudden reaction between light metals of the first and second group of the periodic classification and substances which are capable of reacting with such metals under liberation of considerable quantities of energy, by bringing the said metals and substances suddenly into intensive contact with each other.

2. Method for producing explosions, consisting in bringing light metals of the first and second group of the periodic classification and an explosive suddenly into intensive contact with each other, thus instituting a local detonation which acts as a priming means for the explosive.

3. Method for producing explosions, consisting in bringing light metals of the first and second group of the periodic classification suddenly into intensive contact with such substances containing nitrogen and oxygen, which, by the ordinary priming agents, are not or only with difficulty to be exploded, thus instituting a local detonation which acts as a priming means for said substances.

4. Method for producing explosions, consisting in bringing light metals of the first and second group of the periodic classification, a substance which is capable of reacting with this metal under liberation of considerable quantities of energy, and an explosive suddenly into intensive contact with one another, thus instituting a local detonation which acts as a priming means for the explosive.

5. Method for producing explosions, consisting in bringing potassium, a halogen compound, and an explosive suddenly into intensive contact with one another, thus instituting a local detonation which acts as a priming means for the explosive.

In witness whereof I have hereunto signed my name this 26 day of May 1923, in the presence of two subscribing witnesses.

HERMANN STAUDINGER.

Witnesses:
ALFRED RHEINER,
C. W. WILLIEN.